United States Patent
Subramaniyan et al.

(10) Patent No.: US 7,463,687 B2
(45) Date of Patent: *Dec. 9, 2008

(54) METHOD AND APPARATUS FOR PERFORMING HIGH QUALITY FAST PREDICTIVE MOTION SEARCH

(75) Inventors: Raghavan Subramaniyan, Schaumburg, IL (US); Bhavan Gandhi, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 447 days.

This patent is subject to a terminal disclaimer.

(21) Appl. No.: 11/168,584

(22) Filed: Jun. 28, 2005

(65) Prior Publication Data

US 2005/0238103 A1 Oct. 27, 2005

Related U.S. Application Data

(62) Division of application No. 10/212,940, filed on Aug. 6, 2002, now Pat. No. 6,925,123.

(51) Int. Cl.
*H04B 1/66* (2006.01)

(52) U.S. Cl. .................. 375/240.16; 375/240.12; 375/240.14; 348/699; 382/238; 382/239

(58) Field of Classification Search ............ 375/240.16, 375/240.12, 240.14; 348/699; 382/238, 382/239

See application file for complete search history.

(56) References Cited

U.S. PATENT DOCUMENTS

| | | | | |
|---|---|---|---|---|
| 5,557,341 | A * | 9/1996 | Weiss et al. | 348/699 |
| 6,778,606 | B2 * | 8/2004 | Kang et al. | 375/240.16 |
| 6,891,891 | B2 * | 5/2005 | Pau et al. | 375/240.16 |
| 6,925,123 | B2 * | 8/2005 | Subramaniyan et al. | 375/240.16 |

* cited by examiner

*Primary Examiner*—Shawn An
(74) *Attorney, Agent, or Firm*—Gary J. Cunningham

(57) ABSTRACT

A method and apparatus for performing a predictive motion search in a video encoder system using motion vectors representing the difference in coordinates of a macroblock of data in a current frame of video data and coordinates of a related macroblock of data in a reference frame of video data. A plurality of motion vector predictors is obtained where the motion vector predictors represent approximations of possible motion vectors for a current macroblock. A search pattern is defined. Each motion vector predictor of the plurality of motion vector predictors is searched around using the search pattern. A final motion vector is then determined.

6 Claims, 5 Drawing Sheets

METHOD AND APPARATUS FOR PERFORMING HIGH QUALITY FAST PREDICTIVE MOTION SEARCH

This application is a divisional application of U.S. Pat. No. 10/212,940, filed on Aug. 6, 2002, which is hereby incorporated by reference.

BACKGROUND OF THE INVENTION

1. Field of the Invention

This invention relates to the field of motion estimation, and in particular to block-based motion estimation as applied to video image compression.

2. Description of Related Art

Presently, motion estimation is a key component of many video compression techniques. The purpose of motion estimation is to reduce temporal redundancy between frames of a video sequence. A motion estimation algorithm predicts image data for an image frame using one or more previously coded image frames or future frames. A difference image is computed by taking the arithmetic difference between the original pixel data and the corresponding predicted pixel data. A difference image with large variations indicates little or no temporal redundancy between the image frames. Whereas, a difference image with small variations indicates a high degree of temporal redundancy between the image frames. The difference image represents a reduced temporal redundancy representation of the image frames, which yields better coding efficiency.

One type of motion estimation algorithm is a block-based motion estimation algorithm. Block-based motion estimation algorithms operate on blocks of image data. A block of image data in a current frame is predicted by a block of data from a previous image frame. The motion estimation algorithm outputs a motion vector for the block of image data that specifies the location of the best block match from the previous image frame. In video compression methods, this motion vector information is compressed and transmitted or stored along with the compressed difference data.

International video compression standards such as H.263, MPEG-2, and MPEG4 allow block-based motion estimation by providing a syntax for specifying motion vectors. These standards do not require specific motion estimation algorithms. Within these compression standards, motion estimation is computed on a base block size of 16×16 pixels denoted as a macroblock. There are allowances to operate on block sizes of 8×8 pixels to estimate motion for smaller image regions. Motion Estimation is one of the most processor intensive units in a video encoding system. There are a number of existing block-based motion estimation techniques which try to strike a compromise between computational complexity and motion vector efficiency.

Full search motion estimation (FSME) exhaustively compares a block in the current image frame to each pixel position located within a search window of a previously processed frame. The goodness of the block match at each pixel position is determined by measuring its corresponding distortion. A typical distortion measure used by block matching metrics is the sum of absolute difference (SAD) metric:

$$SAD = \sum_{n=0}^{N-1} \sum_{m=0}^{M-1} |B_{nm}^c - B_{nm}^p|$$

Where, $B^c$ is the block in the current image frame and $B^p$ is a block in the previous image frame. The indices m and n index the pixels within a block of N rows and M columns. A small SAD value corresponds to a good block match and a large SAD value corresponds to a poor block match. Unfortunately, full search motion estimation becomes prohibitive as the search window is increased.

Presently, there are several low complexity motion algorithms. All off these algorithms suffer from either offering poorer quality or from not offering enough reduction in computational complexity. There are also a few motion estimation algorithms proposed that offer somewhat improved quality at relatively reduced complexity.

One possible approach is a zonal based approach. First, a motion vector predictor (PMV) is calculated as a best matching motion vector. Then, a motion vector search following a zonal pattern around the PMV is performed. This is followed by similar zonal search around a zero motion vector. At every step, there is a criterion to end the search if a good enough criterion is obtained. Unfortunately, this approach does not give consistently good results over a wide range of video sequences.

A motion estimation algorithm called PMVFAST is very similar to the above described zonal approach. However, instead of a zonal search pattern, an iterative diamond search pattern is use. Large or small diamond search patterns can be used depending upon certain criteria. Unfortunately, this approach gives a very similar result when compared to the zonal approach.

SUMMARY OF THE INVENTION

A method and apparatus for performing a fast predictive motion search in a video encoder system using block-based motion estimation. The method may include obtaining a plurality of motion vector predictors, where the motion vector predictor can represent approximations of possible motion vectors for a current macroblock. The method may also include defining a search pattern, searching around each motion vector predictor of the plurality of motion vector predictors using the search pattern, and determining a final motion vector.

DETAILED DESCRIPTION OF PREFERRED EMBODIMENTS

The present invention gives an improved performance over a wide range of video sequences. There are several improvements and new algorithmic innovations that result in better quality. In fact, when averaged over several video sequences, the present invention out-performs even the traditional full search algorithm in terms of achieved video compression efficiency.

All the methods used in prior art focus on optimizing the block match, while, among other benefits, the present invention can explicitly take into account the number of bits needed to encode the video sequence. The present invention can also take advantage of the nature of motion encountered in real life video capture.

Presently, with the wireless market taking off, there will be more requirements to enable video encoding technology on hand-held devices. Most of these devices do not have the processing capability to perform the intense computations of motion estimation. Thus, the high quality, low complexity motion estimation algorithm provided by the present invention can be extremely useful in such devices.

According to one embodiment, the present invention can be performed in two stages. In the first stage several predictor motion vectors can be considered and a search around each of the candidates can be performed using a fixed search pattern. During the course of the first stage, if it is found that a good match is unlikely to be achieved, a new set of candidate motion vectors can be selected and a new search can be performed. This can be done to capture the motion of any new object that appears in the scene. In the second stage, the best result of the first stage can be considered and a new search using a moving, weighted, spiral search pattern can be performed to arrive the best block match.

Figure 1:
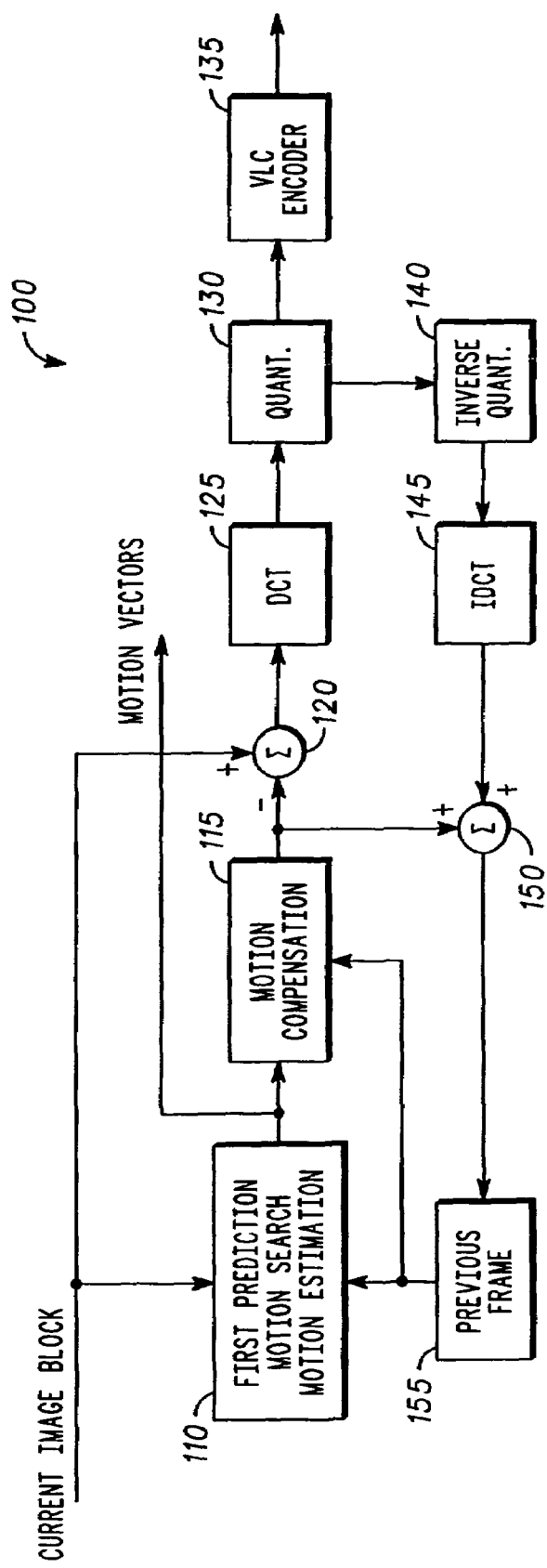
FIG. 1 is an exemplary block diagram of a video compression system according to one embodiment.

FIG. 1 is an exemplary block diagram of a video compression system 100 for a video encoder according to one embodiment. The video compression system 100 can include a fast predictive motion search motion estimation circuit 110, a motion compensation circuit 115, an adder 120, a discrete cosine transform circuit (DCT) 125, a quantizer 130, a variable length code (VLC) encoder 135, an inverse quantizer 140, an inverse discrete cosine transform circuit (IDCT) 145, another adder 150, and a previous frame circuit 155.

In operation, motion estimation is computed for blocks of image data from a current image frame using one or more previously processed image frames. The motion estimation circuit 110 outputs a motion vector corresponding to a processed block. The motion compensation circuit 115 forms a prediction block from the previous frame using the computed motion vectors. A difference image is computed by the adder 120 by subtracting the predicted image data from the current image frame. This difference image is transformed using the DCT circuit 125. Whereas the motion estimation circuit 110 and the motion compensation circuit 115 serve to reduce the temporal redundancy between image frames, the DCT circuit 125 serves to reduce the spatial redundancy within a frame. The DCT coefficients are subsequently are subject to reduced precision by the quantizer 140. The quantizer 140 increases compression while introducing numerical loss. The quantized DCT coefficients are then encoded by the VLC encoder 135 and transmitted in a compressed video bitstream along with the motion vectors. The local reconstruction loop is comprised of the inverse quantizer 140, the IDCT 145, and the adder 150. The inverse quantizer 140 reconstructs the DCT coefficients. The IDCT 145 transforms the DCT coefficients back into the spatial domain to form a quantized difference image. The reconstructed frame is computed by the adder 150 by adding the motion compensated data to the quantized difference image. This reconstructed data is then stored in the previous frame circuit 155 for use in processing subsequent image frames.

The operation of the fast predictive motion search motion estimation circuit 110 can consist of two stages. In the first stage, a small search can be done around several motion vector predictors. These motion vector predictors (MVP) can be obtained from other motion vectors (MV). For initial definitions, an MV is the difference in co-ordinates of a block of data in the current frame of video data and the block of data in the reference frame to which it is matched. An MV has two components: X and Y. The value of an MV is described as an ordered pair (X, Y). MVPs are MVs that are used as a good "guess" of the best MV when performing a match. A macroblock (MB) is a 16×16 block of data within a video frame. A MB can also refer to a blocks of data of different sizes as well (e.g. 8×8, 4'8, 4'4, 16'8 etc.) without loss of generality.

One motion vector predictor can be based on a zero motion vector. A motion vector predictor being based on a particular motion vector can define the motion vector predictor as equal to the particular motion vector. The zero motion vector being a motion vector with the coordinates of (0,0). A second motion vector predictor can be based on a motion vector of the co-located macroblock in the previous frame.

Figure 2:
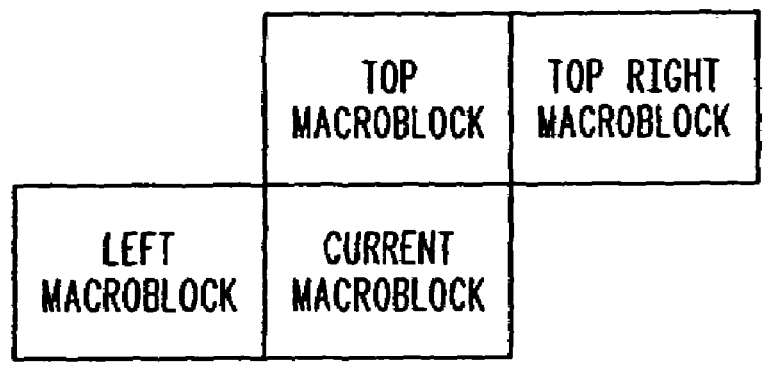
FIG. 2 is an exemplary depiction of a neighborhood of a current macroblock according to one embodiment.

FIG. 2 is an exemplary illustration of the location of a current macroblock and neighboring macroblocks used to determine additional motion vectors. Thus, a third motion vector predictor can be based on the motion vector of the macroblock to the left of the current macroblock. A fourth motion vector predictor can be based on the motion vector of the macroblock to the top of or above the current macroblock. A fifth motion vector predictor can be based on the motion vector of the macroblock above and to the right of the current macroblock. A sixth motion vector predictor can be based on the median motion vector of the third, fourth, and fifth motion vector predictors. This median motion vector predictor can be computed independently for the X and Y components of the motion vector.

A seventh motion vector predictor can be based on an estimated global motion vector. This global motion vector is estimated by the motion estimation circuit 110 as the average of all final motion vectors of the previous frame for which a difference metric was below a certain threshold THRESH1. The difference metric can be a sum of absolute difference metric, a sum of squares difference metric, a modified sum of absolute difference metric, or any other useful metric. In the preferred embodiment, the value of THRESH1 chosen is:

THRESH1=SAD1+OFFSET,

Where OFFSET may nominally be set to 500
Where SAD1 is given by the equation:

$$SAD1 = \sum_{n=0}^{N-1}\sum_{m=0}^{M-1} |B_{nm}^c - \text{mean}|$$

$$\text{mean} = \frac{\sum_{n=0}^{N-1}\sum_{m=0}^{M-1} B_{nm}^c}{MN}$$

Here m and n are indexes of the pixel. M and N are the dimensions of the block. For an example macroblock, M=N=16. The global motion vector may also be determined by other means such as motion sensors on video cameras, other algorithms, or any other means for determining a global motion vector.

Further motion vector predictors can be determined based on the result of motion estimation done for the same macroblock, but on a different previously coded frame.

Thus, the motion estimation circuit 110 can determine the global motion vector by using an average of all final motion vectors in a previous frame for which a difference metric is below a specified threshold. In particular, the motion estimation circuit 110 can determine the global motion vector by calculating a difference metric for each of final motion vectors in a previous frame, comparing the difference metric for each of the final motion vectors in the previous frame with a predetermined threshold, and determining the global motion vector based on the each of the final motion vectors in a previous frame with a difference metric that is below the threshold.

All MVs within a small region around each MVP can be searched. Then, the MV with the lowest Modified Sum of Absolute Differences (MSAD) metric can be chosen as the candidate MV for the second stage. The MSAD metric is defined below.

Thus, the motion estimation circuit 110 can perform a predictive motion search by obtaining a plurality of motion vector predictors, the motion vector predictors representing approximations of possible motion vectors for a current macroblock, defining a search pattern, searching around each motion vector predictor of the plurality of motion vector predictors using the search pattern, and determining a final motion vector. The motion estimation circuit can further calculate a difference metric representing a quality of a macroblock match, where the difference metric can be a sum of absolute differences metric, a sum of squares of differences metric, or any other metric useful in motion estimation.

Figure 3:
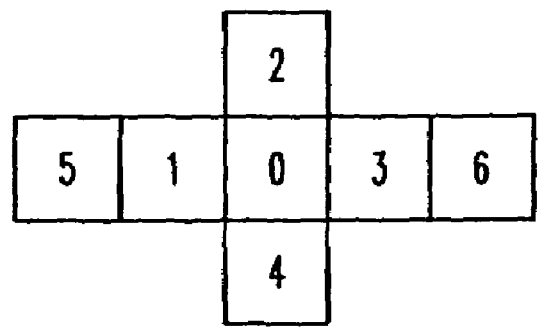
FIG. 3 is an exemplary search pattern used during a first stage of a preferred embodiment.

An example search pattern around each MVP is shown in FIG. 3. As shown, the search pattern can extend more in the horizontal direction than in the vertical direction. This can take advantage of the fact that in most real life video data, there is more motion and variations in motion in the horizontal direction.

If, after evaluating the first 6 motion vectors, the best MV has a MSAD metric higher than a threshold THRESH2, the first stage can go into capture mode. In the preferred embodiment, THRESH2 is given by:

THRESH2=4*MMSADAVG,

MMSADAVG=Average of all MMSADS (i.e. MSADS of best MVs) of the previous frame.

Figure 4:
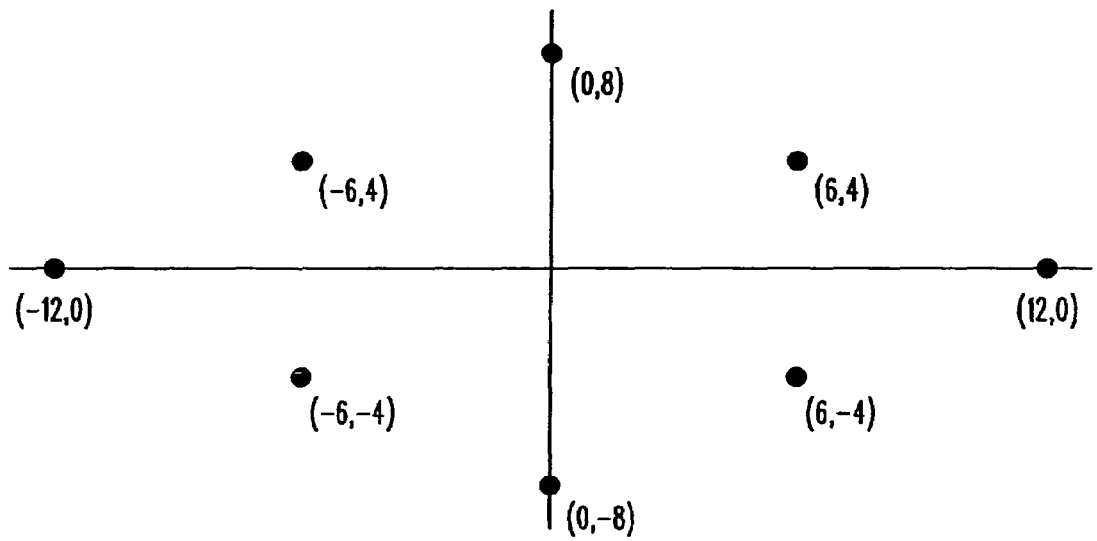
FIG. 4 is an exemplary search pattern used in a capture mode during a first stage of a preferred embodiment.

In the capture mode, additional MVPs can be considered such as those depicted in FIG. 4. For example, the 8 points can be:

(−12,0) (12, 0) (0, −8) (0, 8) (−6, 4) (6, 4) (6, 4) (−6, 4)

A search around each of the MVPs is performed using the same search pattern depicted in FIG. 3. In the preferred embodiment, only 4 out of the 8 MVPs can be considered for a macroblock. For the first macroblock, the first 4 are considered. For the next macroblock the other 4 MVPs are considered and so on. This can be done to reduce the number of computations.

The aim of the capture mode is to detect any new object that moves rapidly into the screen. In such a scenario, the MVPs based on neighborhood motion vectors would fail. Using the 8 new points improves the chance of getting a good motion vector match. The 8 points can be chosen to favor the horizontal direction since there often is more motion in this direction.

Thus, the motion estimation circuit 110 can search around each motion vector predictor of the plurality of motion vector predictors using the search pattern, determine a best motion vector having a difference metric higher than a predetermined threshold, and perform a search pattern around a new set of motion vector predictors.

In the first stage, when the search pattern around a MVP is being evaluated, an early exit criterion can be employed to terminate the search for that MVP. The search can be terminated if the MSAD obtained for the MV is higher than the current minimum MSAD (MMSAD) by a threshold THRESH3, i.e., if $(MSAD_i>(MMSAD+THRESH3))$. Where $MSAD_i$ is the MSAD obtained for MVPi, MMSAD is the minimum of all the MSAD values obtained until this point for the current MB. In particular, it is the MSAD of the best MV. In the preferred embodiment, the value of THRESH3 can be chosen to be around 768.

Thus, the motion estimation circuit 110 can perform a search pattern on the motion vector predictors, determine a current difference metric for a current motion vector, compare the current difference metric to a previous minimum difference metric, set a new minimum difference metric if the current difference metric is below the previous minimum difference metric, and terminate the search pattern if the difference metric exceeds the previous minimum metric by a predetermined amount.

Then, among all the MVs searched in the first stage, the MV that gives the lowest MSAD metric is chosen and this becomes a starting point for the second stage.

Figure 5:
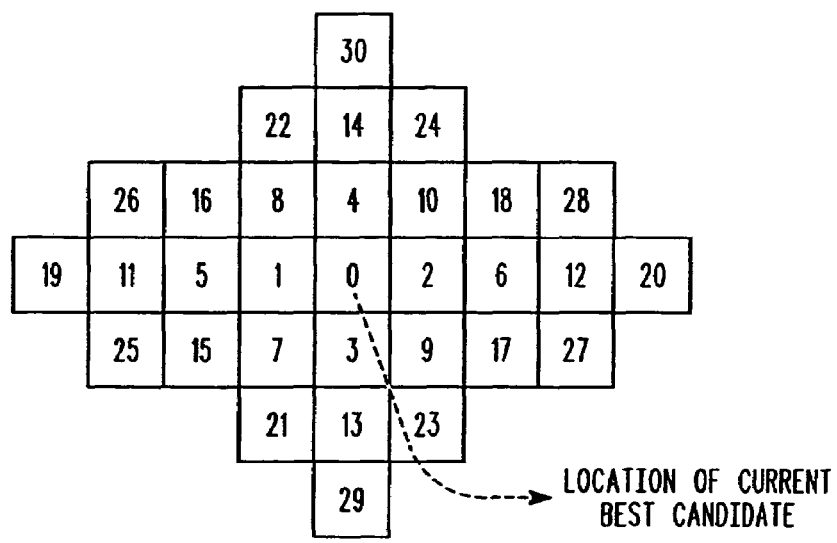
FIG. 5 is an exemplary illustration of a search pattern used during a second stage of a preferred embodiment.

In the second stage, the best MV from the first stage (i.e. the one giving the lowest MSAD) is chosen and a search is performed around this MV. For example, the search can be performed in a pattern as depicted in FIG. 5. The search pattern can start from the center and can spiral out in a sequence as shown in FIG. 5 as a sequence of numbers. As soon as a better MV is found (i.e. MV which gives a lower MSAD), the search pattern is recentered around the new MV and the spiral search pattern starts over. This process continues until one of 3 conditions are met:

CONDITION 1: The MSAD is below a threshold THRESH4, given by:

THRESH4=$A*Q+B$

Where Q is the quantization step size used by the encoder for the current MB, A and B are constants. In the preferred embodiment, A=8 and B=0.

CONDITION 2: The maximum number of candidates, N, have already been considered in stage 2. In the preferred embodiment, N=30.

CONDITION 3: These is no improvement in the minimum MSAD (MMSAD) during the last M candidate MVs. Here M is a function of the index of the position of the last MV candidate in the spiral search pattern. For example, the search starts from index 0. It then spirals around points 1, 2, 3, . . . Whenever a better MV is found, the spiral search pattern gets re-centered around this new MV and the index starts from 0 once again. This index is used to determine the value of M. In the preferred embodiment, M is chosen from the set of values {4, 4, 4, 4, 4, 4, 4, 4, 4, 5, 5, 5, 5, 6, 6, 6, 6, 7, 7, 7, 7, 7, 7, 8, 8, 8, 8, 8, 9, 9} based on the index.

The best MV at the end of the second stage is chosen as the best MV for the macroblock. This MV can be further refined for half-pixel, quarter-pixel or higher accuracy in a subsequent stage using well known techniques.

As mentioned above, the search pattern can be chosen to give wider coverage to the horizontal direction than the vertical direction.

The MSAD metric can be a useful part of the invention. While the modified sum of differences metric gives preferred results, any difference metric can be interchangeably used in every embodiment of the present invention requiring a sum of absolute differences metric, a modified sum of differences metric, or any other difference metric. The MSAD metric is a function of the sum of absolute differences (SAD) described above, the candidate MV being evaluated, and the predictor motion vector (PMV). The PMV is generally used by the video encoder during the encoding of the final motion vector. The final motion vector is encoded as a difference with respect to PMV, which is different from a MVP. For example, it can be a unique MV defined within H.261, H.263, MPEG-1, MPEG-2 and MPEG-4 standards for the purpose of encoding motion vectors. The SAD is the metric used in classical motion estimation algorithms as described above.

For a macroblock with a given PMV and for a candidate motion vector MV, MSAD is given by MSAD=SAD+Bias Where the bias id any value that is based on a difference metric between MV and PMV. For example,

MSAD=SAD+$C^*$(|$MV_X$–$PMV_X$|+|$MV_Y$–$PMV_Y$|)

Where SAD is the classical metric used for the matching blocks defined earlier, $MV_X$ and $MV_Y$ are the X and Y components of the candidate motion vector, $PMV_X$ and $PMV_Y$ are the X and Y components of PMV, and C is a constant. In the preferred embodiment, C is approximately 5. The PMV generally stays fixed for all the candidates in an MB, while the MV changes.

The MSAD metric is independent of the motion estimation algorithm and can be used to advantage in practically all algorithms. The benefit of the new metric is the reduced number of bits needed to encode motion vectors by biasing the algorithm towards PMV thus improving the overall compression efficiency.

The MSAD for the zero motion vector, MV=(0, 0), is treated as a special case. The zero MV could potentially lead to improved compression efficiency. But this can happen only if the resultant macroblock is coded in the "not coded" mode within H.261, H.263, MPEG-1, MPEG-2 and MPEG-4 standards. This can be taken into account by biasing the SAD in the case where it is below a certain threshold:

If (SAD<THRESH5)

MSAD=SAD–THRESH6

Else

MSAD=SAD+$C^*$(|$PMV_x$|+|$PMV_Y$|)

Endif

C, $PMV_x$ and $PMV_Y$ are as described earlier.

THRESH5=$D^*Q+E$

THRESH6=$F$

Where Q is the quanization step size. D, E and F are constants. In a preferred embodiment D is approximately 128, E=0, and F is approximately 100.

Thus, the motion estimation circuit 110 can calculate a difference metric, calculate a bias based on a predictor motion vector and a candidate motion vector, and determine a modified difference metric based on the difference metric and the bias.

During the search process, it can be likely that search regions of different MVPs may overlap leading to repeated candidate motion vectors. A log can be maintained of all the candidates evaluated already and they are ignored if they have been considered already.

The search sequences depicted are the ones used in the preferred embodiment. They have been optimized to get a good match in the quickest possible time over a wide range of video sequences. It is possible to use alternative search patterns as well.

The disclosed invention does not make any assumptions on the motion vector range. Any restriction on the motion vector values can be applied on the candidates and, if they are beyond the allowed range, they can be discarded.

In the second stage of the preferred embodiment, the spiral search pattern can be re-centered on obtaining a new best matched candidate MV. Thus, the next point that needs to be evaluated may not be known apriori. The next candidate to be evaluated potentially depends on the result of evaluating the current candidate. Hence it may becomes difficult to implement several candidate MSAD calculations in parallel (which some hardware architectures may want to do). To alleviate this, the re-centering of the search pattern can be done after evaluating a set of candidates, allowing the set to be processed in parallel.

Figure 6:
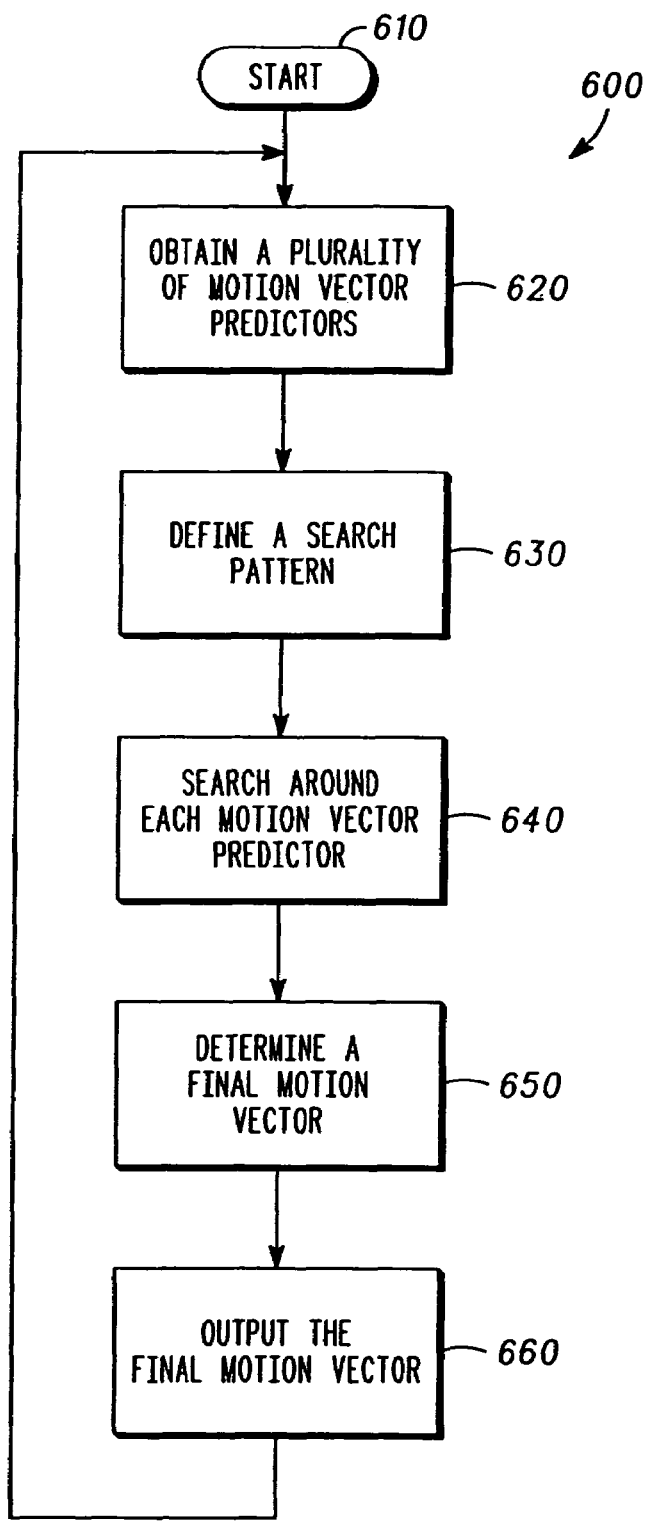
FIG. 6 is an exemplary flowchart outlining the operation of the present invention according to a preferred embodiment.

FIG. 6 is an exemplary flowchart 600 outlining the operation of the motion estimation circuit 110 according to one embodiment. In step 610, the flowchart begins. In step 620, the motion estimation circuit 110 obtains a plurality of motion vector predictors. In step 630, the motion estimation circuit. 110 defines a search pattern. In step 640, the motion estimation circuit 110 searches around each motion vector predictor. In step 650, the motion estimation circuit 110 determines a final motion vector. In step 660, the motion estimation circuit 110 outputs the final motion vector.

Figure 7:
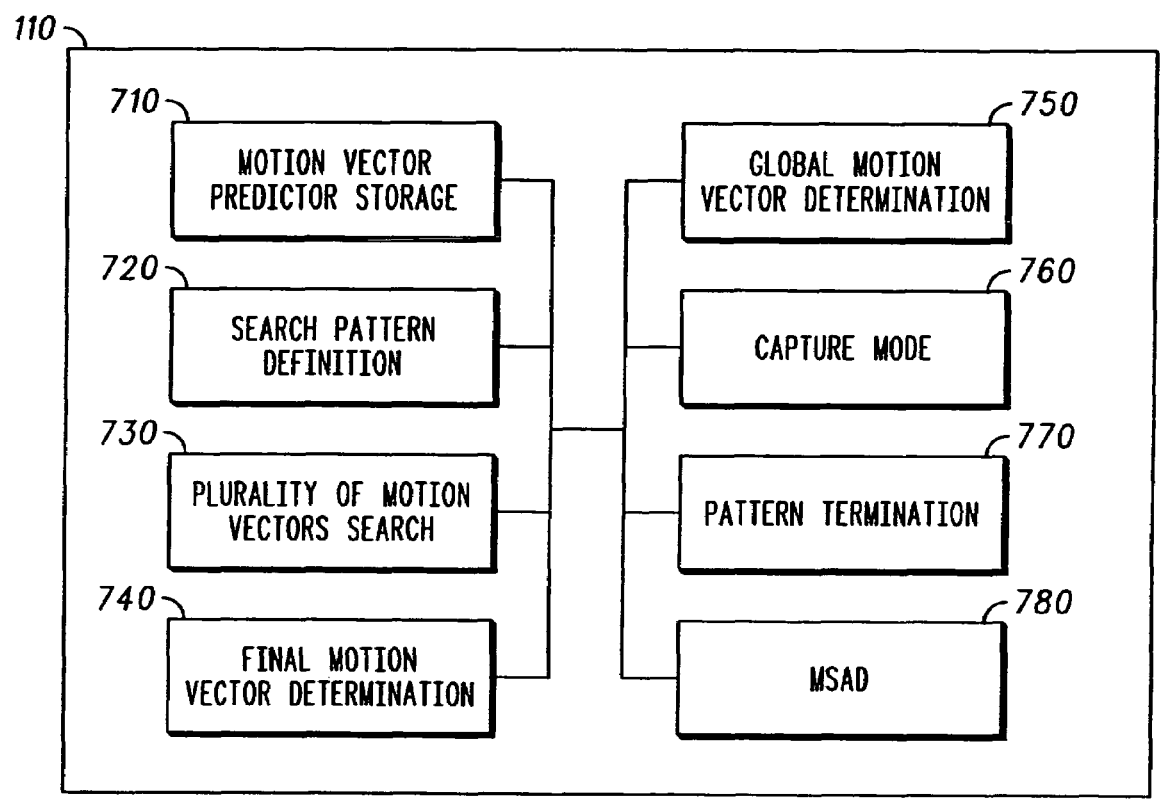
FIG. 7 is an exemplary block diagram of a fast predictive motion search motion estimation circuit according to one embodiment.

FIG. 7 is an exemplary block diagram of a fast predictive motion search motion estimation circuit 110 according to one embodiment. The motion estimation circuit 110 can include a motion vector predictor storage circuit 710, a search pattern definition circuit 720, a plurality of motion vectors search circuit 730, and a final motion vector determination circuit 740. The motion estimation circuit 110 can also include a global motion vector determination circuit 750, a capture mode circuit 760, a pattern termination circuit 770, and a modified sum of absolute differences circuit 780. The circuits operate in accordance with their like functions described above.

According to another related embodiment, a fast predictive motion search method can be performed by two stages. In the first stage, the 7 MVP candidates can be computed as described above. Then, for each MVP, all MV candidates can be evaluated according to the search pattern in FIG. 3 and the exit criteria can be employed to break out of the MVP or go into the capture mode. Next, if in the capture mode, the search can be performed at and around the MVP depicted in FIG. 4 using the same search pattern in FIG. 3 and the same exit criteria. Then, in the second stage, the best MV from the first stage can be chosen and a search can be performed in a spiral fashion depicted in FIG. 5. The spiral can be re-centered and reset the index can be reset to zero whenever a better match is found. Finally, the process can be continued until one of the three exit criteria are found.

According to another related embodiment, the present invention provides a method for performing a fast predictive motion search in a video encoder system using block-based motion estimation. The method can include determining a plurality of motion vector predictors, performing a search pattern on at least one of the plurality of motion vector predictors, determining a best motion vector having a difference metric higher than a predetermined threshold, and performing a new search pattern around a new set of motion vector predictors. The step of performing a new search pattern can further perform a new search pattern around a new set of motion vector predictors based on a best motion vector. The new search pattern can be biased more in the horizontal direction than the vertical direction.

According to another related embodiment, the present invention can provide a method for performing a fast predictive motion search in a video encoder system using block-based motion estimation. The method can include performing a search pattern around a motion vector predictor, determining a current difference metric for a current motion vector, comparing the current difference metric to a previous minimum difference metric, setting a new minimum difference metric if the current difference metric is below the previous minimum difference metric, and terminating the search pattern if the difference metric exceeds the previous minimum metric by a predetermined amount.

According to another related embodiment, the present invention can provide a method for performing fast predictive motion search in a video encoder system using motion vectors representing the difference in coordinates of a macroblock of data in a current frame of video data and coordinates of a related macroblock of data in a reference frame of video data. The method can include defining a search pattern that is more extensive in a horizontal direction than in a vertical direction, performing a candidate search based on the defined search pattern, and determining a final motion vector.

The disclosed invention can achieve a high degree of compression efficiency while keeping the complexity low. The complexity can be similar to the complexity of APDZS and PMVFAST. However, the achieved quality is higher. When compared with the standard full search algorithm, which is the accepted reference in the industry, the present invention achieves about 0.6% better compression efficiency for a fixed video quality. This number was obtained after averaging over 24 different QCIF video sequences.

One application for this invention is in real time video encoders on hand held devices. The typical bandwidth of such encoded video is in the range 32 kbps to 512 kbps and the typical video frame size is QCIF and CIF.

The method of this invention is preferably implemented on a programmed processor. However, the video compression system 100, fast predictive motion search motion estimation circuitry 110, and other elements may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures and the methods described may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Accordingly, the preferred embodiments of the invention as set forth herein are intended to be illustrative, not limiting. Various changes may be made without departing from the spirit and scope of the invention.

What is claimed is:

1. A method for performing a fast predictive motion search in a video encoder system using block-based motion estimation, comprising:
   determining at least three motion vector predictors, the motion vector predictors representing approximations of possible motion vectors for a current macroblock;
   defining a search pattern;
   after determining all of the at least three motion vector predictors, searching around each motion vector predictor of the at least three motion vectors using the search pattern;
   determining a best motion vector having a difference metric higher than a predetermined threshold; and
   performing a new search pattern around a new set of motion vector predictors.

2. The method according to claim 1, wherein the step of performing a new search pattern further performs a new search pattern around a new set of motion vector predictors based on a best motion vector.

3. The method according to claim 1, wherein the new search pattern is biased more in the horizontal direction than the vertical direction.

4. A method for performing a fast predictive motion search in a video encoder system using block-based motion estimation, comprising:
   performing a search pattern around a motion vector predictor;
   determining a current difference metric for a current motion vector;
   comparing the current difference metric to a previous minimum difference metric;
   setting a new minimum difference metric if the current difference metric is below the previous minimum difference metric; and
   terminating the search pattern if the difference metric exceeds the previous minimum metric by a predetermined amount.

5. A method for performing a fast predictive motion search in a video encoder system using block-based motion estimation, comprising:
   determining at least three motion vector predictors in a first stage, the motion vector predictors representing approximations of possible motion vectors for a current macroblock;
   defining a search pattern;
   after determining all of the at least three motion vector predictors, searching around each motion vector predictor of the at least three motion vectors using the search pattern in the first stage;
   determining a best motion vector predictor; and
   performing a new search pattern around the best motion vector predictor in a second stage.

6. The method according to claim 5, wherein the new search pattern is performed in an approximate spiral pattern.

* * * * *